(12) United States Patent
Lei et al.

(10) Patent No.: US 10,922,001 B2
(45) Date of Patent: Feb. 16, 2021

(54) VECTOR-BASED STORAGE MANAGEMENT

(71) Applicant: EMC IP Holding Company LLC, Hopkinton, MA (US)

(72) Inventors: Lu Lei, Shanghai (CN); Julius Zhu, Shanghai (CN); Alex Pengbo Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/456,848

(22) Filed: Jun. 28, 2019

(65) Prior Publication Data
US 2020/0233580 A1  Jul. 23, 2020

(30) Foreign Application Priority Data
Jan. 23, 2019 (CN) .......................... 2019 1 0065165

(51) Int. Cl.
*G06F 12/00* (2006.01)
*G06F 13/00* (2006.01)
*G06F 3/06* (2006.01)

(52) U.S. Cl.
CPC ............ *G06F 3/064* (2013.01); *G06F 3/0608* (2013.01); *G06F 3/0611* (2013.01); *G06F 3/0653* (2013.01); *G06F 3/0673* (2013.01)

(58) Field of Classification Search
CPC ...... G06F 12/0866; G06F 21/79; G06F 3/064; G06F 12/1009
See application file for complete search history.

(56) References Cited

U.S. PATENT DOCUMENTS

2016/0210342 A1\* 7/2016 Vallabhaneni .......... G06F 3/061

\* cited by examiner

*Primary Examiner* — Sean D Rossiter
(74) *Attorney, Agent, or Firm* — Amin, Turocy & Watson, LLP (57) ABSTRACT

The present disclosure relates to a method, apparatus and computer program product for managing a storage system. According to implementations of the present disclosure, there is provided a method for managing a storage system. In the method, an object vector is created based on multiple objects stored in the storage system, here an object element in the object vector is associated with at least one object among the multiple objects. Multiple chunks included in the storage system are divided into multiple groups. For a group among the multiple groups, a chunk vector is created based on each chunk in the group, here a chunk element in the chunk vector is associated with a chunk in the group. A mapping matrix is created for managing the storage system based on the object vector and the chunk vector. Moreover, there is provided an apparatus and computer program product for managing a storage system. By means of the technical solution of the present disclosure, the number of storage units involved in processing and input/output time overheads may be reduced.

20 Claims, 8 Drawing Sheets

VECTOR-BASED STORAGE MANAGEMENT

RELATED APPLICATION

The present application claims the benefit of priority to Chinese Patent Application No. 201910065165.X, filed on Jan. 23, 2019, which application is hereby incorporated into the present application by reference herein in its entirety.

FIELD

Various implementations of the present disclosure relate to a storage system, and more specifically, to a method, apparatus and computer program product for managing multiple objects stored in a storage system and multiple chunks included in the storage system.

BACKGROUND

With the development of computer technology, various storage systems are already widely applied in all types of data. Object-based storage systems have been developed so far. In such a storage system, storage spaces from multiple storage devices are managed as chunks. At this point, user data may be distributed as objects in one or more chunks in the storage system.

Since the storage system might comprise a large number of chunks, and many users of the storage system might frequently add, modify or delete objects from the storage system, there might be a great many chunks in the storage system which are no longer used by objects of any users. At this point, it becomes a hot research topic regarding how to manage multiple objects stored in the storage system and multiple chunks included in the storage system.

SUMMARY

Therefore, it is desirable to develop and implement a technical solution for managing a storage system more effectively. It is desired that the technical solution can be compatible with existing application environments and manage the storage system more effectively by reconstructing various configurations of existing application environments.

According to a first aspect of the present disclosure, there is provided a method for managing a storage system. In the method, an object vector is created based on multiple objects stored in the storage system, here an object element in the object vector is associated with at least one object among the multiple objects. Multiple chunks included in the storage system are divided into multiple groups. For a group among the multiple groups, a chunk vector is created based on each chunk in the group, here a chunk element in the chunk vector is associated with a chunk in the group. A mapping matrix is created for managing the storage system based on the object vector and the chunk vector.

According to a second aspect of the present disclosure, there is provided an apparatus for managing a storage system, comprising: at least one processor; a volatile memory; and a memory coupled to the at least one processor, the memory having instructions stored thereon, the instructions, when executed by the at least one processor, causing the apparatus to perform acts. The acts include: creating an object vector based on multiple objects stored in the storage system, here an object element in the object vector is associated with at least one object among the multiple objects; dividing multiple chunks included in the storage system into multiple groups; for a group among the multiple groups, creating a chunk vector based on each chunk in the group, here a chunk element in the chunk vector is associated with a chunk in the group; and creating a mapping matrix for managing the storage system based on the object vector and the chunk vector.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
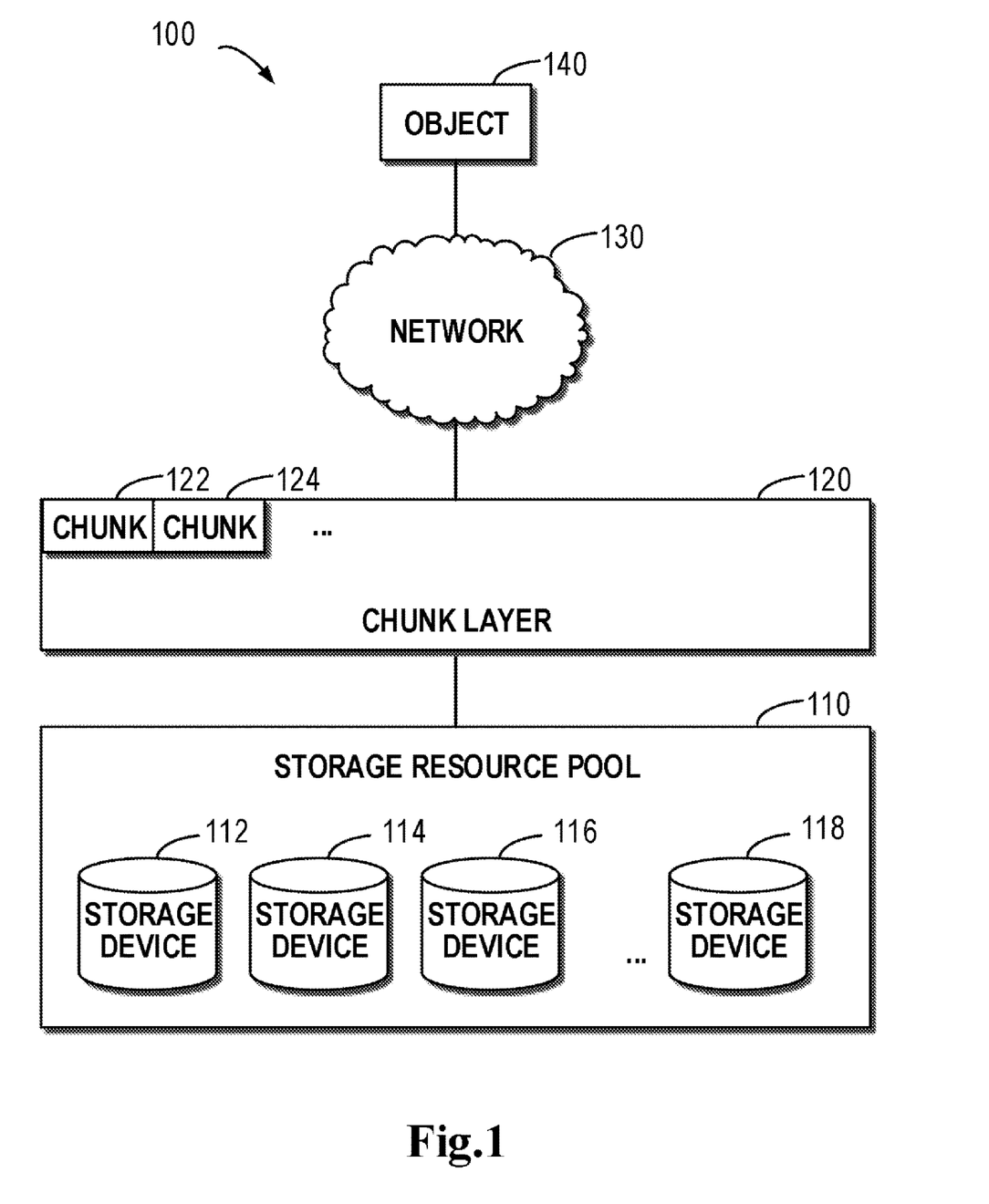
FIG. 1 schematically illustrates a block diagram of a storage system in which a method of the present invention may be implemented.

FIG. 1 schematically shows a block diagram of a storage system 100 in which implementations of the present invention may be implemented. As depicted, there may be provided a resource pool 110, and the resource pool 110 may comprise multiple storage devices 112, 114, 116, . . . , 118. Although multiple independent physical storage devices 112, 114, 116, . . . , 118 are shown here, according to example implementations of the present disclosure, each storage device may further be a virtual storage device. A storage device 100 may further be provided based on the resource pool 110. Above the resource pool 110, a chunk layer 120 may further be provided. The chunk layer may comprise multiple chunks divided by predetermined size, such as a chunk 122, a chunk 124, etc. The size of each chunk may be set according to a concrete application environment of the storage system. For example, the chunk may be set as 128 M or other value.

A user of the storage system 100 may access the chunks 122, 124 and so on at the chunk layer 120 via a network 130, and at this point data from the user may be stored at the chunk layer 120 in the form of an object 140. In view of the size of the object 140 or other policy, the object 140 may be stored to one or more chunks at the chunk layer 120. Specifically, suppose the size of the chunk is set as 128 M and the size of the object 140 is 256 M, then the object 140 may be stored in the chunks 122 and 124. At this point, it may be considered the chunk 122 is referenced by the object 140 and the chunk 124 is also referenced by the object 140.

It will be understood each chunk may further be divided into smaller storage units according to an address range. Here the storage unit may be called data block. Suppose the object 140 has a size of 10 M, then the object 140 may be stored in a 10 M-sized data block in the chunk 122. At this point, it may be considered the data block is referenced by the object 140, and the rest part of the chunk 122 may further be divided into data blocks having other size, so as to store data from other objects.

It will be understood the above reference relations between data blocks in a chunk and objects are merely for the illustration purpose. Although one data block is reference by one object as shown above, the data block may be simultaneously referenced by multiple objects. For example, suppose the object 1 references a data block 1, and the object 1 is duplicated as the object 2, then at this point the object 2 also references the data block 1. Further, one object may comprise data in multiple data blocks in multiple chunks. In this case, there may exist multiple-to-multiple complex reference relations between data blocks and objects.

It will be understood as lots of users continuously add, modify and delete objects from the storage system 100, mapping relations between objects and chunks in the storage system 100 might change constantly. When a certain chunk contains no more data belonging to any object, data in the chunk are no longer valid data, so storage space of the chunk may be reclaimed for re-allocation.

Technical solutions for managing chunks and objects in a storage system have been proposed. According to one technical solution, a reclaiming table may be built based on to-be-reclaimed chunks and objects in a storage system. Suppose the storage system 100 stores M objects and comprises N chunks, then at this point a reclaiming table is as shown in Table 1 below.

TABLE 1

Example of Reclaiming Table

| Chunk | Object 1 | Object 2 | ... | Object M |
|---|---|---|---|---|
| Chunk 1 | N | N | N | N |
| Chunk 2 | Y | N | N | N |
| ... | ... | ... | ... | ... |
| Chunk N | N | Y | N | M |

The first row in Table 1 shows M objects stored in the storage system 100, i.e., an object 1, an object 2, . . . , an object M. The first column in Table 1 shows N chunks included in the storage system 100, i.e., a chunk 1, a chunk 2, . . . , a chunk N. As shown in Table 1, the intersection between a row and a column represents whether an object associated with the intersection is stored in a chunk associated with the intersection. For example, a symbol "N" at the intersection between the object 1 and the chunk 1 represents the object 1 is not stored in the chunk 1, a symbol "Y" at the intersection between the object 1 and the chunk 2 represents the object 1 is stored in the chunk 2. During running of the storage system 100, data in the reclaiming table may be updated in a predetermined time period. If it is found a certain chunk contains no more data from any object, then the chunk may be reclaimed.

As shown in Table 1, all symbols in the row where the chunk is located are "N," which represents the chunk 1 contains no more data from any object; at this point, the chunk 1 may be reclaimed. For another example, a symbol at the intersection between the row where the chunk 2 is and the column where the object 1 is "Y" while other symbols are all "N," which represents the chunk 2 comprises data from the object 1; at this point, the chunk 2 should not be reclaimed.

Although various chunks in the storage system 100 may be managed based on the foregoing technical solution, the reclaiming table will occupy larger storage space. For example, where there are M objects and N chunks, the reclaiming table will comprise M×N elements. Since data about various objects are managed in parallel using separate processing resources, for rows associated with the chunk 1 in Table 1, it is highly possible that data of most relevant objects have been updated while data of few objects are not yet updated. Therefore, only after data of all relevant objects are updated, whether the chunk 1 comprises data of a certain object may be determined.

Specifically, since the storage system 100 scans the reclaiming table at predetermined time intervals, for the chunk 2, data in the reclaiming table can only be obtained until the next time interval. Even if the symbol "Y" is updated as "N" immediately after scanning, the reclaim operation can only be performed until the next scanning.

Further, updating data at each intersection will occupy space and computing resources of a processor in the storage system 100, frequent data reads and writes with respect to each intersection will increase input/output workloads, and further the overall performance of the storage system 100 will be degraded.

At this point, it becomes a hot research topic regarding how to manage objects and chunks in the storage system 100 with higher efficiency. In order to at least partly solve problems in existing technical solutions, according to implementations of the present disclosure, there is proposed a technical solution for managing the storage system 100.

Figure 2:
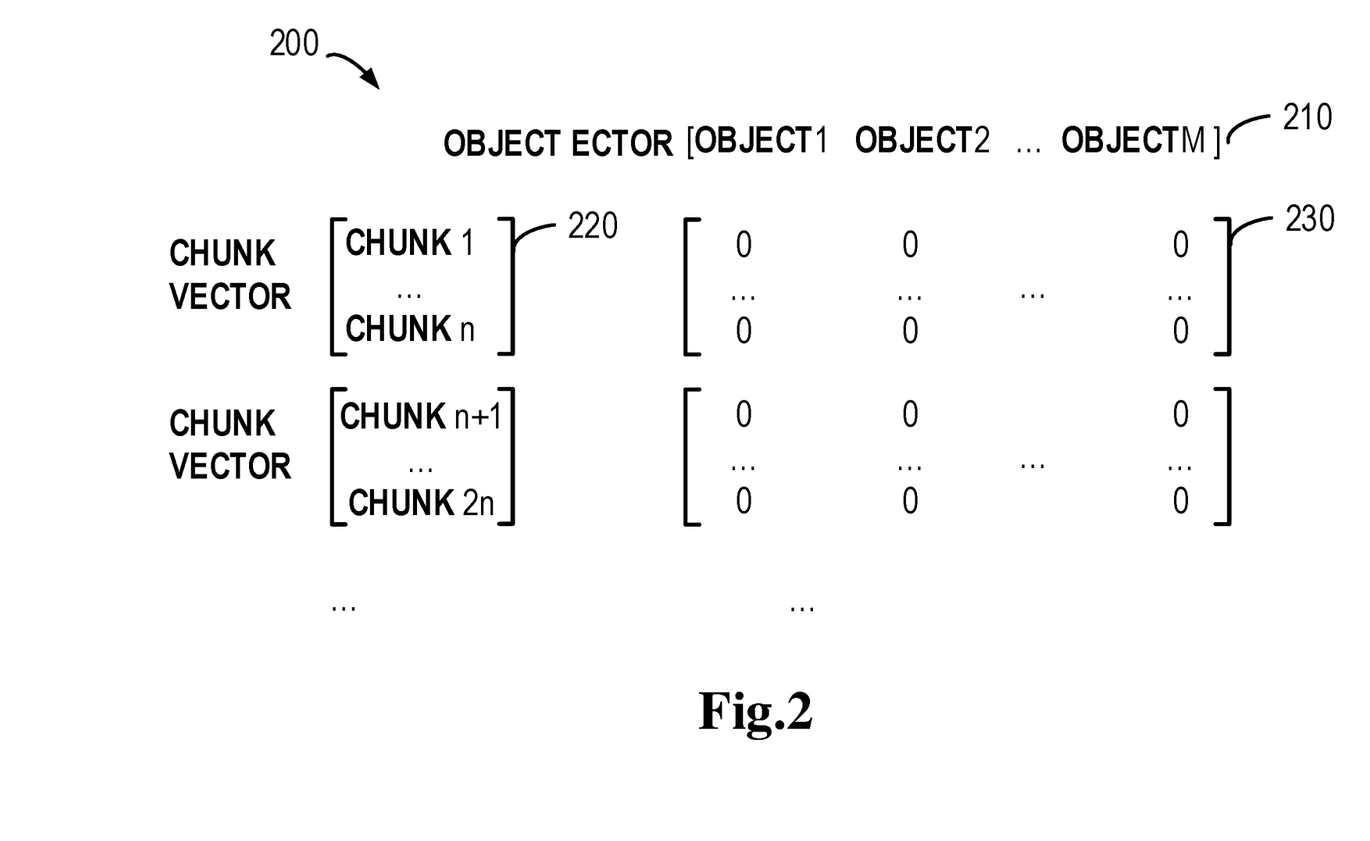
FIG. 2 schematically illustrates a block diagram for managing a storage system according to implementations of the present disclosure.

With reference to FIG. 2, implementations of the present disclosure will be described in brief. FIG. 2 schematically shows a block diagram 200 for managing the storage system 100 according to implementations of the present disclosure. As depicted, an object vector 210 may be built based on multiple objects 1, 2, . . . , M stored in the storage system 100. At this point, an object element in the object vector 210 is associated with at least one object among the multiple objects. It will be understood although each element involves one object as shown, according to example implementations of the present disclosure, each element may further involve multiple objects.

Multiple chunks included in the storage system 100 may be divided into multiple groups, for example, a first group may comprise chunks 1, 2, . . . , n, and a second group may comprise chunks n+1, n+2, 2n. At this point, regarding a group among the multiple groups, a chunk vector may be created based on various chunks in the group. For example, a chunk vector 220 may be created based on the first group, at which point a chunk element in the chunk vector 220 is associated with a chunk in the first group. Subsequently, a mapping matrix 230 may be created for managing the storage system 100 based on the object vector 210 and the chunk vector 220. It will be understood although FIG. 2 shows each group comprises the same number of chunks, according to example implementations of the present disclosure, each group may comprise a different number of chunks.

By means of the foregoing example implementations, chunks and objects in the storage system 100 may be managed according to the form of vector and matrix. Specifically, by dividing multiple chunks into groups and building chunk vectors, multiple chunk elements in the chunk vector may be operated at a time. In this way, the complexity may be avoided which is caused by updating elements in the reclaiming table with respect to each object and each chunk one by one. In other words, multiple chunks may be handled at a time in the form of batch handling.

Suppose the storage system 100 comprises M objects and comprises N chunks, and the N chunks are divided into multiple groups each comprising n chunks. According to conventional practice, M×N read and write operations will be performed to the reclaiming table when maintaining the reclaiming table. By means of example implementations of the present disclosure, since read and write operation may be performed to the chunk vector comprising n chunk information at a time, the access count may be reduced to M×N/n. Further, each access operation further involves additional operations such as checking whether a cache is hit, loading data to the cache and so on. The reduction of the access count will greatly reduce extra overheads caused by additional operation and hence increases the overall operation efficiency of the storage system 100.

In addition, by means of the foregoing example implementations, it may be ensured the updating of all elements in the reclaiming table is completed in a short time, further it may be determined quickly which chunks in the storage system 100 are no longer used, and reclaim operation may be performed accordingly. Thereby, support may be provided to the storage system 100 to clear chunks which are no longer used, and further potential problems caused by storage space shortage in the storage system 100 may be solved.

Figure 3:
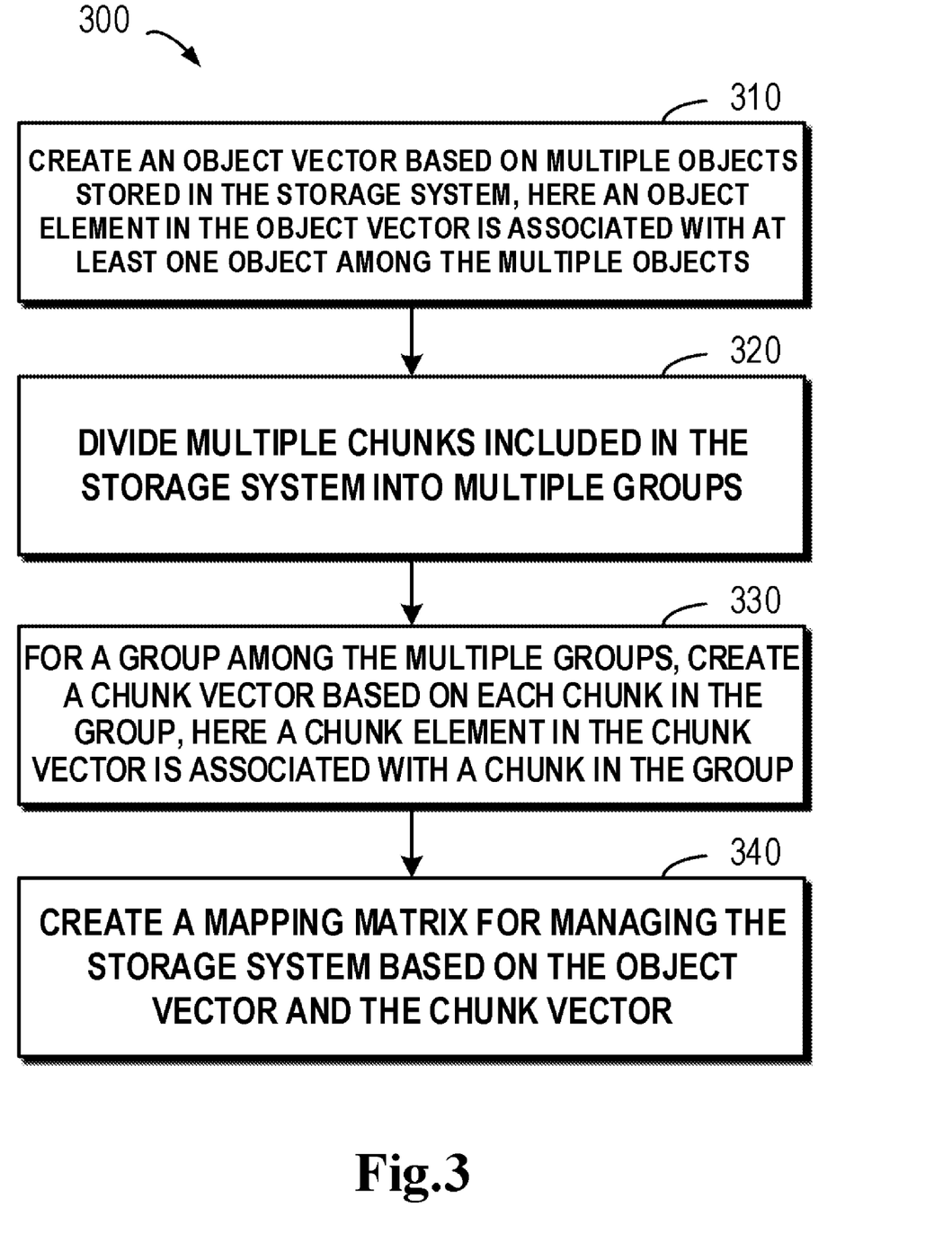
FIG. 3 schematically illustrates a flowchart of a method for managing a storage system according to implementations of the present disclosure.

More details about the present disclosure will be described with reference to FIG. 3, which schematically shows a flowchart of a method 300 for managing the storage system 100 according to implementations of the present disclosure. At block 310, an object vector is created based on multiple objects stored in the storage system 100, here an object element in the object vector is associated with at least one object among the multiple objects. According to example implementations of the present disclosure, corresponding object elements in the object vector may be determined based on identifiers of various objects. For example, if the storage system 100 stores an object 1, an object 2, . . . , an object M, then the object vector 210 may be represented as: object vector [object 1, object 2, . . . , object M].

According to example implementations of the present disclosure, the multiple objects may be further divided into multiple partitions, and each object element in the object vector may be determined based on an object in each partition. The partitioning may be performed simply in order of identifiers of objects. For example, first the number "m" indicating how many objects are comprised in each partition may be determined, and subsequently M objects may be divided into multiple partitions based on the number m. According to example implementations of the present disclosure, the partitioning may be further performed based on distributed hash table technology. At this point, first the number of partitions may be determined, and subsequently multiple objects may be divided into multiple partitions according to the determined number.

According to example implementations of the present disclosure, the number of the multiple partitions is determined based on at least one of: the number of the multiple objects, processing performance of a processor in the storage system 100, and storage space of the processor. In general, if the storage system 100 stores many objects, then these objects may be divided into a larger number of partitions. If the storage system 100 stores few objects, then these objects may be divided into a smaller number of partitions.

In addition, processing performance of the processor in the storage system 100 will affect the performance of performing operations to the object vector. Therefore, if the processing performance is high, then the object vector comprising more object elements may be handled; if the processing performance is low, then the object vector comprising less object elements may be handled. Further, storage space of the processor in the storage system 100 decides whether storage space accommodating the object vector can be provided. Therefore, if the storage space is large, then the object vector comprising more object elements may be handled; if the storage space is small, then the object vector comprising less object elements may be handled.

At block 320, multiple chunks included in the storage system 100 are divided into multiple groups. At this point, first the number of groups may be determined. Specifically, the number of the multiple groups may be determined based on at least one of: the number of the multiple chunks, processing performance of a processor in the storage system, and storage space of the processor.

In general, if the storage system 100 comprises a great number of chunks, then these chunks may be divided into more groups. If the storage system 100 stores a small number of chunks, then these chunks may be divided into less groups. In addition, processing performance of the processor in the storage system 100 will affect the performance of performing operations to the chunk vector. Therefore, if the processing performance is high, then the chunk vector comprising more chunk elements may be handled; if the processing performance is low, then the chunk vector comprising less chunk elements may be handled. Further, storage space of the processor in the storage system 100 decides whether storage space accommodating the chunk vector can be provided. Therefore, if the storage space is large, then the chunk vector comprising more chunk elements may be handled; if the storage space is small, then the chunk vector comprising less chunk elements may be handled.

At block 330, for a group among the multiple groups, a chunk vector may be created based on various chunks in the group, and a chunk element in the chunk vector is associated with a chunk in the group. For example, elements in the chunk vector 220 may be represented based on chunk identifiers of various chunks. Returning to FIG. 2, when the group comprises n chunks, the chunk vector 220 may be represented as [chunk 1, . . . , chunk n] arranged vertically, wherein each chunk element is an identifier of a corresponding chunk.

At block 340, a mapping matrix 230 is created for managing the storage system 100 based on the object vector 210 and the chunk vector 220. As shown in FIG. 2, here a "vector product" operation may be applied to the object vector 210 and the chunk vector 220 so as to obtain the mapping matrix 230. It will be understood in the context of the present disclosure, a matrix element in the resultant mapping matrix 230 represents an address mapping relation between at least one object associated with the matrix element and a chunk associated with the matrix element. As shown in FIG. 2, in the mapping matrix 230, a value at the intersection between the object 1 and the chunk 1 is 0, which represents data of the object 1 are not stored in the chunk 1. If a value at the intersection is 1, this represents data of the object 1 are stored in the chunk 1.

Figure 4:
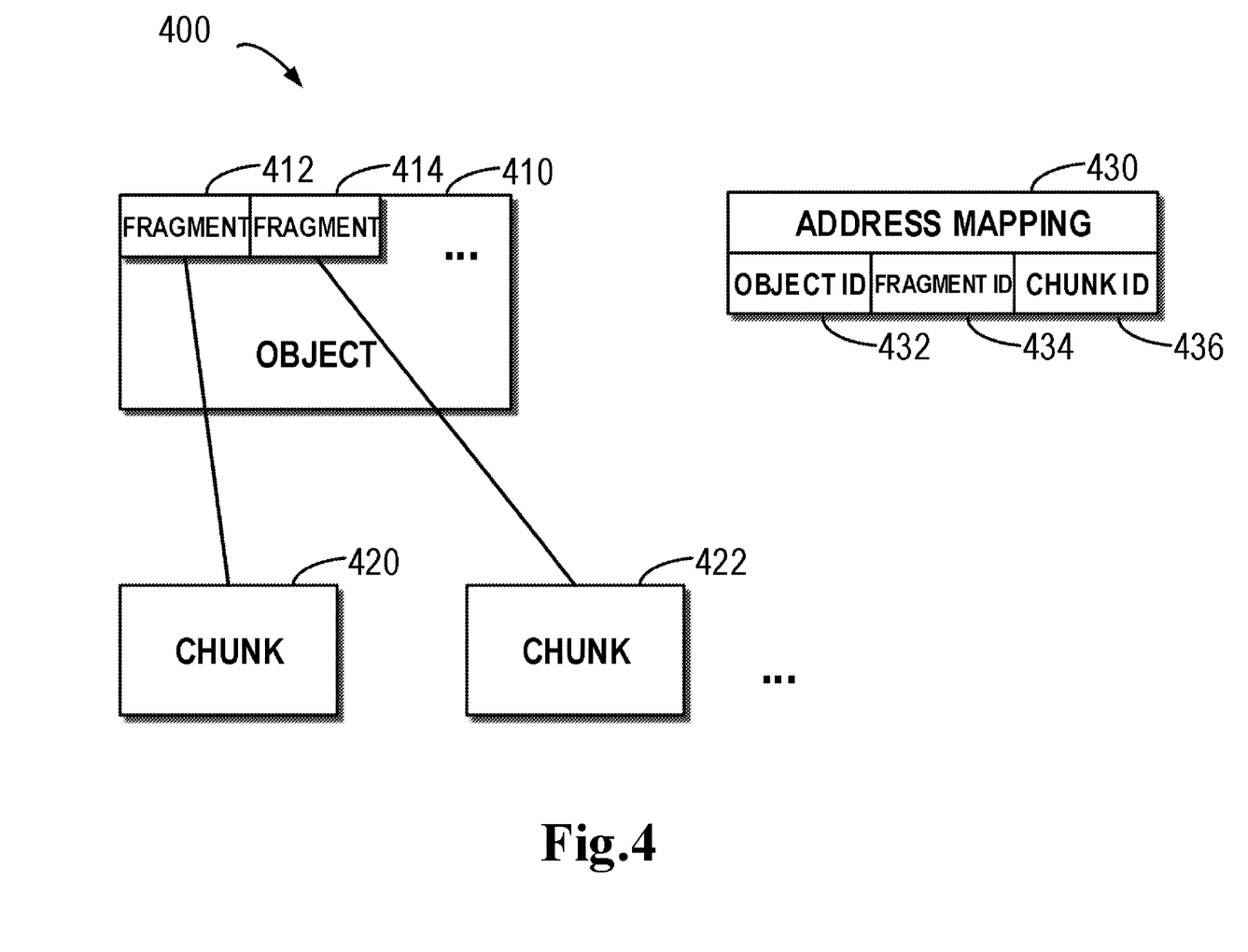
FIG. 4 schematically illustrates a block diagram of an address mapping of a storage system according to implementations of the present disclosure.

Detailed description is presented below to how to create the mapping matrix 230. According to example implementations of the present disclosure, an address mapping of the storage system 100 is obtained, the address mapping describing address mapping relations between the multiple objects and the multiple chunks. FIG. 4 schematically shows a block diagram 400 of an address mapping of the storage system 100 according to implementations of the present disclosure.

As depicted, an object 410 may comprise fragments 412, 414, etc., and the fragment 412 may be stored in a chunk 420 in the storage system 100 and the fragment 414 may be stored in a chunk 422 in the storage system 100. At this point, in order to record where each fragment in the object 410 is stored, the storage system 100 may comprise an address mapping 430 to describe address mapping relations between at least one fragment included in the object 410 and at least one chunk.

As depicted, the address mapping 430 may comprise: an object ID 432, a fragment ID 434 (representing the ID of each fragment in the object) and a chunk ID 436 (representing the ID of a chunk where a certain fragment is stored). Each entry in the address mapping 430 may be generated based on each fragment in each object in the storage system 100, so that the address mapping 430 may describe in which chunk each fragment in each object is stored.

It will be understood the address mapping in FIG. 4 is merely a schematic data structure, and according to example implementations of the present disclosure, the address mapping 430 may further comprise more or less fields. For example, the address mapping 430 may comprise: an object ID field 432 for uniquely indicating each object; and a chunk ID field 436 for indicating a chunk ID to which each fragment in the object belongs. In general, the object may comprise one or more fragments. Although the object 410 comprises multiple fragments as shown in FIG. 4, the object 410 may comprise only one fragment.

According to an example implementation of the present disclosure, the mapping matrix 230 is created based on the object vector 210, the chunk vector 220 and the address mapping, here a matrix element in the mapping matrix 230 represents an address mapping relation between at least one object associated with the matrix element and a chunk associated with the matrix element. In this implementation, for a matrix element in the mapping matrix, a value of the matrix element may be determined. Specifically, an address of at least one object associated with the matrix element in the storage system may be determined based on the address mapping.

According to example implementations of the present disclosure, if it is determined the address points to a chunk corresponding to the matrix element, then the value of the matrix element may be set for indicating that an address mapping relation exists between at least one object associated with the matrix element and a chunk associated with the matrix element. Detailed description is presented below with reference to FIG. 5, which schematically shows a block diagram 500 of determining a value of each matrix element in a mapping matrix based on an address mapping according to implementations of the present disclosure.

Figure 5:
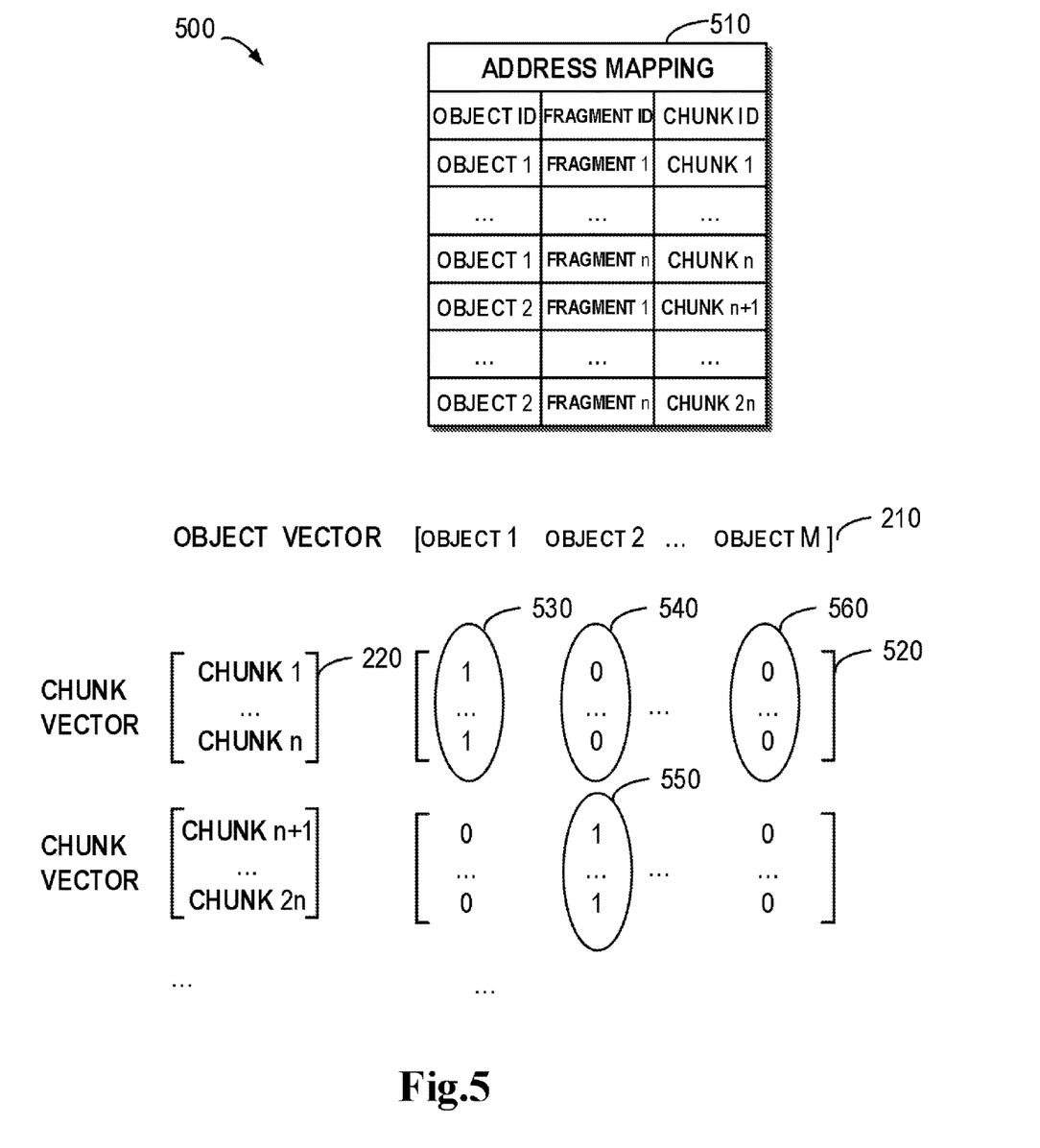
FIG. 5 schematically illustrates a block diagram for determining a value of each matrix element in a mapping matrix based on an address mapping according to implementations of the present disclosure.

For the purpose of description, FIG. 5 shows one object element corresponds to one object. An address mapping 510 schematically shows where in the storage system 100 various fragments in the object 1 and the object 2 are stored. As shown by the address mapping 510, a fragment 1 in the object 1 is stored to the chunk 1, . . . , a fragment n in the object 1 is stored to the chunk n. At this point, as is clear from the address mapping 510, elements in a column shown as an ellipse 530 in a mapping matrix 520 may be set as "1" so as to indicate that the object 1 has an address mapping relation to each of the chunks 1 to n. Further, as is clear from the address mapping 510, the fragment 1 in the object 2 is stored to the chunk n+1, . . . , the fragment n in the object 2 is stored to the chunk 2n. At this point, elements in a column shown as an ellipse 550 may be set as "1" so as to indicate that the object 2 has an address mapping relation to each of the chunks n+1 to 2n.

According to example implementations of the present disclosure, if it is determined the address does not point to a chunk corresponding to the matrix element, then the value of the matrix element may be set for indicating that no address mapping relation exists between at least one object associated with the matrix element and a chunk associated with the matrix element. Still with reference to the address mapping 510, since none of fragments in the object 2 is stored to the chunk 1 to the chunk n, elements in a column shown as an ellipse 540 in the mapping matrix 520 may be set as "0" so as to indicate the object 2 has no address mapping relation to the chunks 1 to n. By means of the foregoing example implementations, elements in the mapping matrix 520 may be accurately determined based on the object vector 210, the chunk vector 220 and the address mapping 510.

According to example implementations of the present disclosure, for a first object element in the object vector, a first group of matrix elements in the mapping matrix which are associated with a first chunk in the chunk vector are determined. At this point, a value of a relevant element in the mapping matrix may be determined by the unit of chunks included in the chunk vector. For example, in one write operation, multiple values of the part shown as the ellipse 530 in the mapping matrix 520 may be updated at a time. Compared with the solution in traditional technology which updates a corresponding element in the reclaiming table with respect to n chunks one by one, the processing efficiency here is n times of that of traditional technology.

It will be understood since the storage system 100 contains substantial processing resources, various objects in the object vector may be handled in parallel. According to example implementations of the present disclosure, for a second object element in the object vector, a second group of matrix elements in the mapping matrix which are associated with the first chunk in the chunk vector are determined in parallel to determining the first group of matrix elements. Specifically, with reference to FIG. 5, values of elements in the parts shown as the ellipses 530 and 540 in the mapping matrix 520 may be determined in parallel.

According to example implementations of the present disclosure, a processing resource may be allocated to each object among the object 1 to the object M, at which point values of elements in the parts shown as the ellipses 530, 540, . . . , 560 in the mapping matrix 520 may be determined in parallel. By means of the example implementations, mapping relations between objects and chunks may be determined at faster speed, and then chunks in the storage system 100 which are no longer used may be discovered as early as possible, and reclaim operation may be performed accordingly. In this way, the possible storage resource shortage in the storage system 100 may be solved.

According to example implementations of the present disclosure, chunks included in various chunk vectors may be handled in parallel. For example, values of elements in the parts shown as the ellipses 540 and 550 in the mapping matrix 520 may be determined in parallel. Where the storage system 100 comprises sufficient computing resources, values of all elements in the mapping matrix may be determined within one time cycle.

Figure 6:
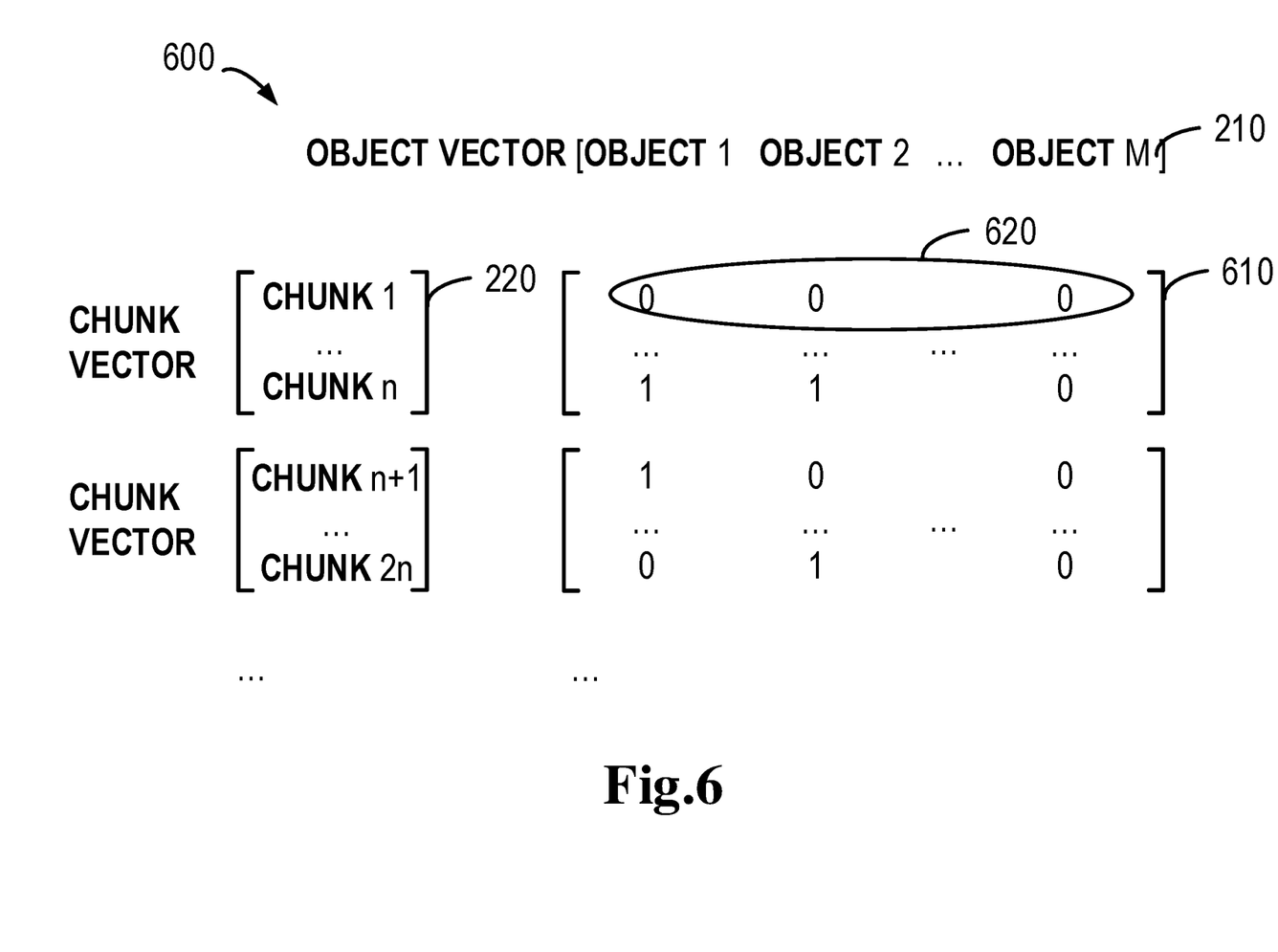
FIG. 6 schematically illustrates a block diagram for reclaiming a chunk from a storage system based on a mapping matrix according to implementations of the present disclosure.

According to example implementations of the present disclosure, if it is determined a group of elements in the mapping matrix which are associated with a given chunk indicate that no address mapping relation exists between the given chunk and all of objects associated with the group of elements, then the storage system 100 is notified to reclaim the given chunk. More details are presented below with reference to FIG. 6, which schematically shows a block diagram 600 for reclaiming a chunk from a storage system based on a mapping matrix according to implementations of the present disclosure. As depicted, a mapping matrix 610 is already generated based on the object vector 210 and the chunk vector 220. The part (all values are 0) shown by an ellipse 620 indicates: no address mapping relation exists between the chunk 1 and all of the object 1 to the object M, at which point storage space occupied by the chunk 1 may be reclaimed.

It will be understood with the running of the storage system 100, users might frequently add, modify or delete objects from the storage system 100. Therefore, the address mapping in the storage system 100 will change. At this point, an updated address mapping in the storage system 100 may be obtained constantly, and matrix elements in the mapping matrix may be updated based on the updated address mapping. At this point, the updated address mapping may accurately reflect a usage state of each chunk in the storage system 100. By means of the foregoing example implementations, chunks in the storage system 100 which are no longer used may be discovered as early as possible and then released.

Figure 7:
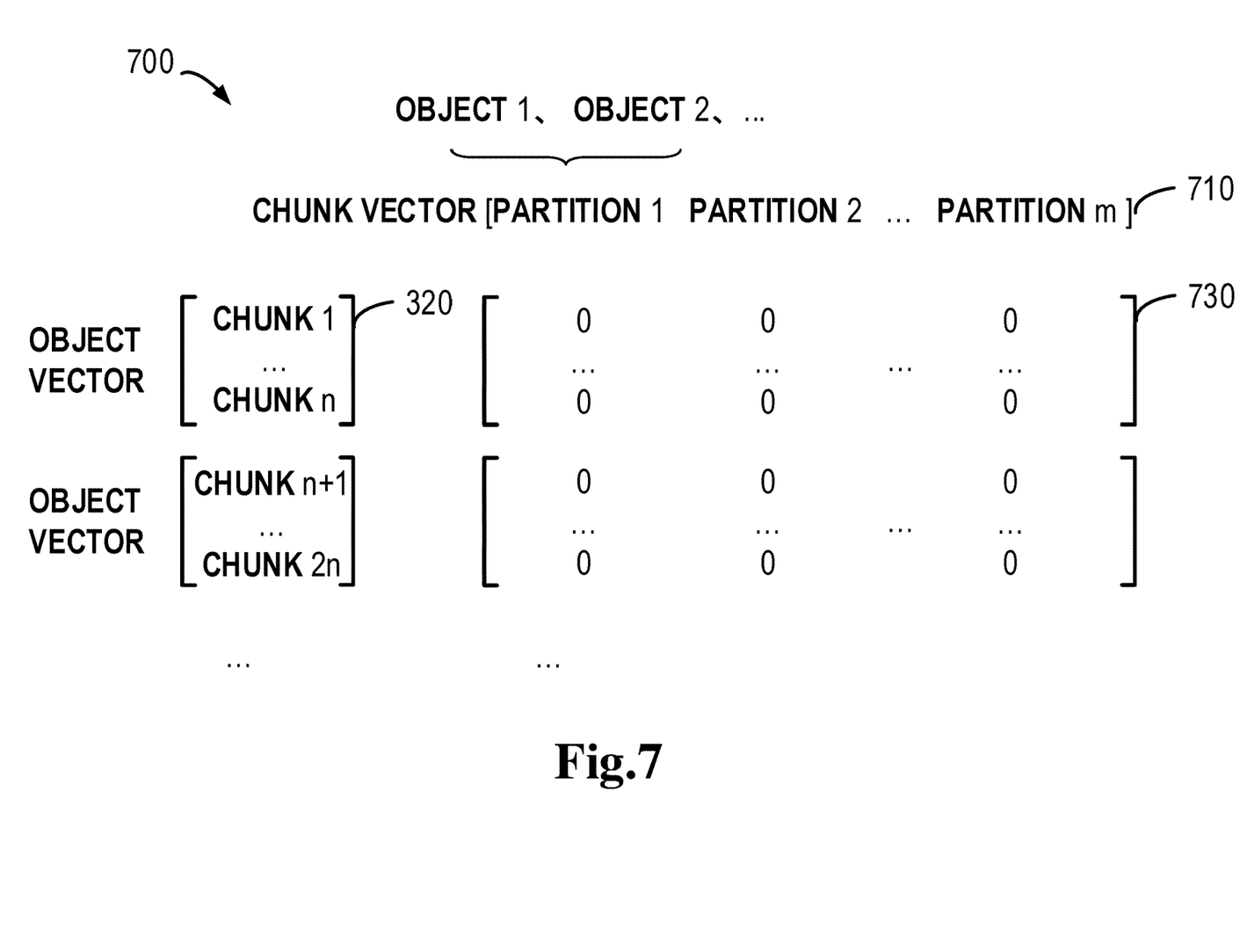
FIG. 7 schematically illustrates a block diagram for obtaining an object matrix based on partitions of objects according to implementations of the present disclosure.

The circumstance in which each object element in the object vector represents one object has been described above. With reference to FIG. 7, detailed description is presented below to more details on how to determine one object element based on multiple objects. FIG. 7 schematically shows a block diagram of obtaining an object matrix based on partitions of objects according to implementations of the present disclosure. According to example implementations of the present disclosure, first M objects may be mapped to m partitions based on a predetermined hash function, where m<M. For example, M objects stored in the storage system 100 may be mapped to 128 partitions based on the hash function. As shown in FIG. 7, one object element in an object vector 710 represents an identifier of one partition.

Suppose a partition 1 comprises an object 1 to an object K, then at this point provided any of the objects 1 to K is in the chunk 1, an element at the intersection between a partition 1 in the object vector 710 and the chunk 1 in a chunk vector 320 will be set as "1" to indicate the chunk 1 and the partition 1 have an address mapping relation between them. Only when none of the objects 1 to K is in the chunk 1, the element at the intersection between the partition 1 in the object vector 710 and the chunk 1 in the chunk vector 320 will be set as "0" to indicate the chunk 1 and the partition 1 have no address mapping relation between them. By means of the example implementation shown in FIG. 7, dimensions of the object vector may be reduced significantly, and further the efficiency of updating the mapping matrix 730 may be increased.

While examples of the method according to the present disclosure have been described in detail with reference to FIGS. 2 to 7, description is presented below to implement of a corresponding apparatus. By means of the foregoing example implementations, relations between chunks and objects may be determined more quickly, and further the circumstance may be avoided in which some fragment or fragments in an object is or are stored in one or more chunks indicated by a to-be-reclaimed list and reclaimed mistakenly. Further, the reliability of the storage system 100 may be improved, and it may be ensured a chunk in the storage system 100 which is no longer used may be reclaimed in time.

According to example implementations of the present disclosure, there is provided an apparatus for managing the storage system 100. The apparatus comprises: an object vector creating module configured to create an object vector based on multiple objects stored in the storage system, here an object element in the object vector is associated with at least one object among the multiple objects; a dividing module configured to divide multiple chunks included in the storage system into multiple groups; a chunk vector creating module configured to, for a group among the multiple groups, create a chunk vector based on each chunk in the group, here a chunk element in the chunk vector being associated with a chunk in the group; and a managing module configured to create a mapping matrix for managing the storage system based on the object vector and the chunk vector.

According to example implementations of the present disclosure, the managing module comprises: an obtaining module configured to obtain an address mapping of the storage system, here the address mapping describes address mapping relations between the multiple objects and the multiple chunks; and a creating module configured to create the mapping matrix based on the object vector, the chunk vector and the address mapping, here a matrix element in the mapping matrix represents an address mapping relation between at least one object associated with the matrix element and a chunk associated with the matrix element.

According to example implementations of the present disclosure, the creating module comprises: an address module configured to, for a matrix element in the mapping matrix, determine an address of at least one object associated with the matrix element in the storage system based on the address mapping; and an element determining module configured to determine a value of the matrix element based on the address.

According to example implementations of the present disclosure, the element determining module is further configured to: in response to determining the address points to a chunk corresponding to the matrix element, set the value to indicate that an address mapping relation exists between at least one object associated with the matrix element and a chunk associated with the matrix element.

According to example implementations of the present disclosure, the element determining module is further configured to: in response to determining the address does not point to a chunk corresponding to the matrix element, set the value to indicate that no address mapping relation exists between at least one object associated with the matrix element and a chunk associated with the matrix element.

According to example implementations of the present disclosure, the creating module further comprises: a first determining module configured to, for a first object element in the object vector, determine a first group of matrix elements in the mapping matrix which are associated with a first chunk in the chunk vector; and a second determining module configured to, for a second object element in the object vector, determine a second group of matrix elements in the mapping matrix which are associated with a second chunk in the chunk vector in parallel to the first determining module.

According to example implementations of the present disclosure, the managing module comprises: a notifying module configured to notify the storage system to reclaim a given chunk in response to determining a group of elements in the mapping matrix which are associated with the given chunk indicate that no address mapping relation exists between the given chunk and all of objects associated with the group of elements have an address mapping relation.

According to example implementations of the present disclosure, the managing module comprises: an updating module configured to obtain the address mapping of the storage system which has been updated, and update matrix elements in the mapping matrix based on the updated address mapping.

According to example implementations of the present disclosure, the dividing module is further configured to: determine the number of the multiple groups based on at least one of: the number of the multiple chunks, processing performance of a processor in the storage system, and storage space of the processor.

According to example implementations of the present disclosure, the object vector creating module is further configured to: divide the multiple objects into multiple partitions; and determine multiple object elements in the object vector based on the multiple partitions.

According to example implementations of the present disclosure, dividing the multiple objects into multiple partitions comprises: determining the number of the multiple partitions based on at least one of: the number of the multiple objects, processing performance of a processor in the storage system, and storage space of the processor.

Figure 8:
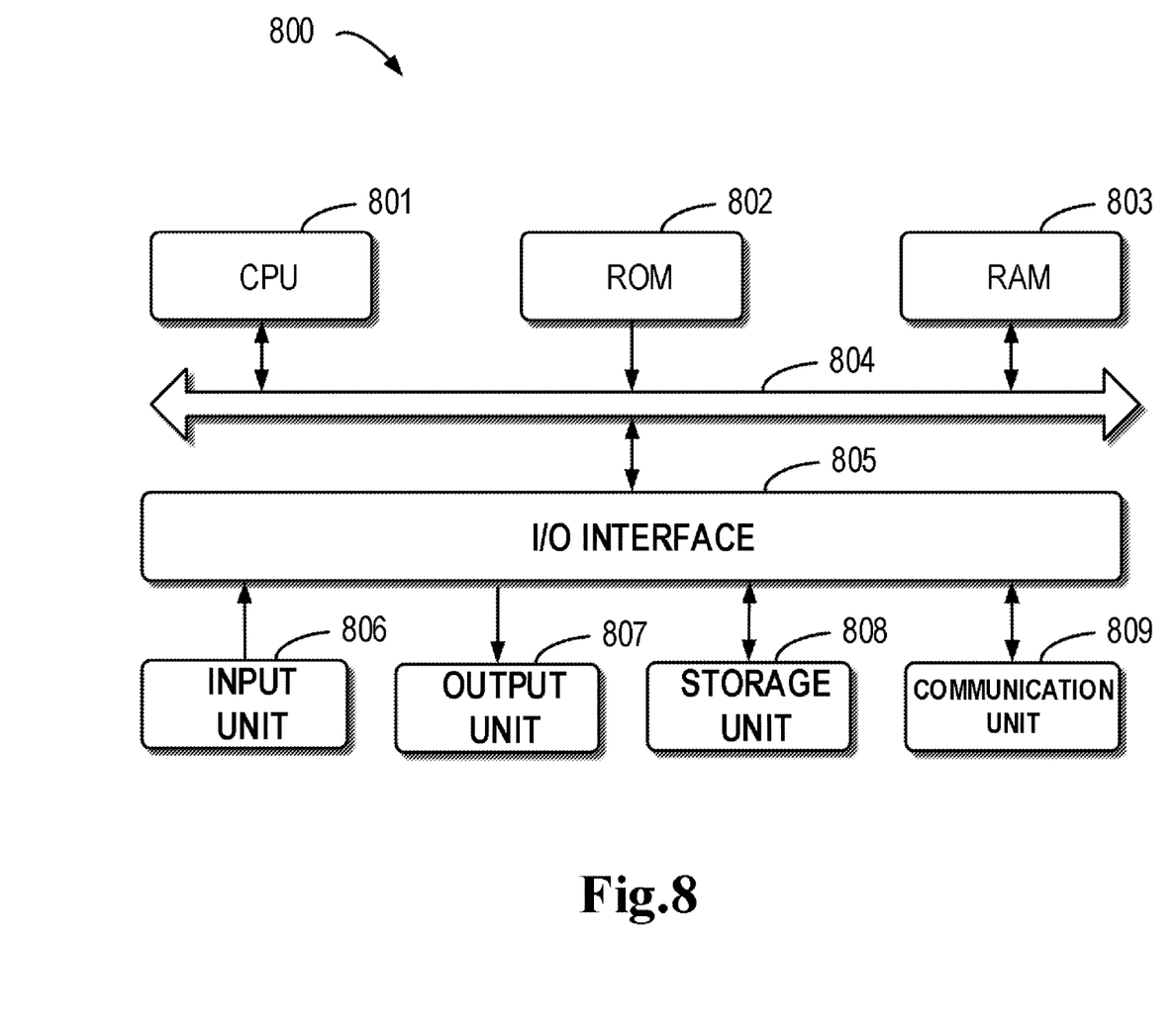
FIG. 8 schematically illustrates a block diagram of an apparatus for managing a storage system according to example implementations of the present disclosure.

FIG. 8 schematically shows a block diagram of an apparatus 800 for managing a storage system according to example implementations of the present disclosure. As depicted, the apparatus 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the apparatus 800. CPU 801, ROM 802 and RAM 803 are connected to each other via a bus 804. The input/output (I/O) interface 805 is also connected to the bus 804.

A plurality of components in the apparatus 800 is connected to the I/O interface 805, including: an input unit 806, such as keyboard, mouse and the like; an output unit 807, e.g., various kinds of display and loudspeakers etc.; a storage unit 808, such as magnetic disk and optical disk etc.; and a communication unit 809, such as network card, modem, wireless transceiver and the like. The communication unit 809 allows the apparatus 800 to exchange information/data with other devices via the computer network, such as Internet, and/or various telecommunication networks.

The above described each process and treatment, such as the method 300, can also be executed by the processing unit 801. For example, in some implementations, the method 300 can be implemented as a computer software program tangibly included in the machine-readable medium, e.g., the storage unit 808. In some implementations, the computer program can be partially or fully loaded and/or mounted to the apparatus 800 via ROM 802 and/or the communication unit 809. When the computer program is loaded to the RAM 803 and executed by the CPU 801, one or more steps of the above described method 300 can be implemented. Alternatively, in other implementations, the CPU 801 also can be configured in other suitable manners to realize the above procedure/method.

According to example implementations of the present disclosure, there is provided an apparatus for managing a storage system, comprising: at least one processor; a volatile memory; and a memory coupled to the at least one processor, the memory having instructions stored thereon, the instructions, when executed by the at least one processor, causing the apparatus to perform acts. The acts include: creating an object vector based on multiple objects stored in the storage system, here an object element in the object vector is associated with at least one object among the multiple objects; dividing multiple chunks included in the storage system into multiple groups; for a group among the multiple groups, creating a chunk vector based on each chunk in the group, here a chunk element in the chunk vector is associated with a chunk in the group; and creating a mapping matrix for managing the storage system based on the object vector and the chunk vector.

According to example implementations of the present disclosure, creating the mapping matrix for managing the storage system based on the object vector and the chunk vector comprises: obtaining an address mapping of the storage system, the address mapping describing address mapping relations between the multiple objects and the multiple chunks; and creating the mapping matrix based on the object vector, the chunk vector and the address mapping, a matrix element in the mapping matrix representing an address mapping relation between at least one object associated with the matrix element and a chunk associated with the matrix element.

According to example implementations of the present disclosure, creating the mapping matrix based on the object vector, the chunk vector and the address mapping comprises:

for a matrix element in the mapping matrix, determining an address of at least one object associated with the matrix element in the storage system based on the address mapping; and determining a value of the matrix element based on the address.

According to example implementations of the present disclosure, determining a value of the matrix element based on the address comprises at least one of: in response to determining the address points to a chunk corresponding to the matrix element, setting the value to indicate that an address mapping relation exists between at least one object associated with the matrix element and a chunk associated with the matrix element; and in response to determining the address does not point to a chunk corresponding to the matrix element, setting the value to indicate that no address mapping relation exists between at least one object associated with the matrix element and a chunk associated with the matrix element.

According to example implementations of the present disclosure, creating a mapping matrix further comprises: for a first object element in the object vector, determining a first group of matrix elements in the mapping matrix which are associated with a first chunk in the chunk vector; and for a second object element in the object vector, determining a second group of matrix elements in the mapping matrix which are associated with a second chunk in the chunk vector in parallel to determining the first group of matrix elements.

According to example implementations of the present disclosure, managing the storage system comprises: notifying the storage system to reclaim a given chunk in response to determining a group of elements in the mapping matrix which are associated with the given chunk indicate that no address mapping relation exists between the given chunk and all of objects associated with the group of elements have an address mapping relation.

According to example implementations of the present disclosure, managing the storage system comprises: obtaining the address mapping of the storage system which has been updated; and updating matrix elements in the mapping matrix based on the updated address mapping.

According to example implementations of the present disclosure, dividing multiple chunks included in the storage system into multiple groups comprises: determining the number of the multiple groups based on at least one of: the number of the multiple chunks, processing performance of a processor in the storage system, and storage space of the processor.

According to example implementations of the present disclosure, creating an object vector based on multiple objects stored in the storage system comprises: dividing the multiple objects into multiple partitions; and determining multiple object elements in the object vector based on the multiple partitions.

According to example implementations of the present disclosure, dividing the multiple objects into multiple partitions comprises: determining the number of the multiple partitions based on at least one of: the number of the multiple objects, processing performance of a processor in the storage system, and storage space of the processor.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method, comprising:
    creating, by a storage system comprising at least one processor, an object vector based on multiple objects stored in the storage system, the object vector comprising a one-dimensional data structure that contains a group of object elements, an object element of the group of object elements being associated with at least one object among the multiple objects;
    organizing multiple chunks included in the storage system into multiple groups;
    for a group among the multiple groups, creating a chunk vector based on each chunk in the group, the chunk vector comprising a one-dimensional data structure that contains a group of chunk elements, a chunk element of the group of chunk elements being associated with a chunk in the group; and
    creating a mapping matrix for managing the storage system based on the object vector and the chunk vector, the mapping matrix indicating where objects identified by the object vector are stored in chunks identified by the chunk vector.

2. The method of claim 1, wherein the creating the mapping matrix for managing the storage system based on the object vector and the chunk vector comprises:
    obtaining an address mapping of the storage system, the address mapping describing address mapping relations between the multiple objects and the multiple chunks; and
    creating the mapping matrix based on the object vector, the chunk vector and the address mapping, a matrix element in the mapping matrix representing an address mapping relation between at least one object associated with the matrix element and a chunk associated with the matrix element.

3. The method of claim 2, wherein the creating the mapping matrix based on the object vector, the chunk vector and the address mapping comprises: for a matrix element in the mapping matrix,
    determining an address of at least one object associated with the matrix element in the storage system based on the address mapping; and
    determining a value of the matrix element based on the address.

4. The method of claim 3, wherein the determining the value of the matrix element based on the address comprises at least one of:
    in response to determining the address points to a chunk corresponding to the matrix element, setting the value to indicate that an address mapping relation exists between at least one object associated with the matrix element and a chunk associated with the matrix element; and
    in response to determining the address does not point to a chunk corresponding to the matrix element, setting the value to indicate that no address mapping relation exists between the at least one object associated with the matrix element and the chunk associated with the matrix element.

5. The method of claim 3, wherein the creating the mapping matrix further comprises:
for a first object element in the object vector, determining a first group of matrix elements in the mapping matrix that are associated with a first chunk in the chunk vector; and
for a second object element in the object vector, determining a second group of matrix elements in the mapping matrix that are associated with a second chunk in the chunk vector in parallel to the determining the first group of matrix elements.

6. The method of claim 2, further comprising managing the storage system, comprising:
notifying the storage system to reclaim a given chunk in response to determining a group of elements in the mapping matrix, which are associated with the given chunk, indicate that no address mapping relation exists between the given chunk and all of objects associated with the group of elements.

7. The method of claim 6, wherein the managing the storage system comprises:
obtaining an updated address mapping of the storage system which has been updated from the address mapping; and
updating matrix elements in the mapping matrix based on the updated address mapping.

8. The method of claim 1, wherein the organizing the multiple chunks included in the storage system into the multiple groups comprises: determining the number of the multiple groups based on at least one of:
the number of the multiple chunks, a processing performance of a processor of the at least one processor in the storage system, or a storage space of the processor.

9. The method of claim 1, wherein the creating the object vector based on the multiple objects stored in the storage system comprises:
dividing the multiple objects into multiple partitions; and
determining multiple object elements in the object vector based on the multiple partitions.

10. The method of claim 9, wherein the dividing the multiple objects into the multiple partitions comprises: determining the number of the multiple partitions based on at least one of
the number of the multiple objects, a processing performance of a processor of the at least one processor in the storage system, or a storage space of the processor.

11. An apparatus for managing a storage system, comprising:
at least one processor;
a volatile memory; and
a memory coupled to the at least one processor and having instructions stored thereon, the instructions, when executed by the at least one processor, cause the apparatus to perform acts comprising:
creating an object vector based on multiple objects stored in the storage system, the object vector comprising a one-dimensional data structure that contains a group of object elements, an object element in the object vector being associated with at least one object among the multiple objects;
organizing multiple chunks included in the storage system into multiple groups;
for a group among the multiple groups, creating a chunk vector based on each chunk in the group, the chunk vector comprising a one-dimensional data structure that contains a group of chunk elements, a chunk element in the chunk vector being associated with a chunk in the group; and
creating a mapping matrix for managing the storage system based on the object vector and the chunk vector, the mapping matrix indicating where objects identified by the object vector are stored in chunks identified by the chunk vector.

12. The apparatus of claim 11, wherein the creating the mapping matrix for managing the storage system based on the object vector and the chunk vector comprises:
obtaining an address mapping of the storage system, the address mapping describing address mapping relations between the multiple objects and the multiple chunks; and
creating the mapping matrix based on the object vector, the chunk vector and the address mapping, a matrix element in the mapping matrix representing an address mapping relation between at least one object associated with the matrix element and a chunk associated with the matrix element.

13. The apparatus of claim 12, wherein the creating the mapping matrix based on the object vector, the chunk vector and the address mapping comprises: for a matrix element in the mapping matrix,
determining an address of at least one object associated with the matrix element in the storage system based on the address mapping; and
determining a value of the matrix element based on the address.

14. The apparatus of claim 13, wherein the determining the value of the matrix element based on the address comprises at least one of:
in response to determining the address points to a chunk corresponding to the matrix element, setting the value to indicate that an address mapping relation exists between at least one object associated with the matrix element and a chunk associated with the matrix element; and
in response to determining the address does not point to a chunk corresponding to the matrix element, setting the value to indicate no address mapping relation exists between the at least one object associated with the matrix element and the chunk associated with the matrix element.

15. The apparatus of claim 13, wherein the creating the mapping matrix further comprises:
for a first object element in the object vector, determining a first group of matrix elements in the mapping matrix, which are associated with a first chunk in the chunk vector; and
for a second object element in the object vector, determining a second group of matrix elements in the mapping matrix, which are associated with a second chunk in the chunk vector, in parallel to the determining the first group of matrix elements.

16. The apparatus of claim 12, wherein the acts further comprise managing the storage system, comprising:
notifying the storage system to reclaim a given chunk in response to determining a group of elements in the mapping matrix, which are associated with the given chunk, indicate that no address mapping relation exists between the given chunk and all of objects associated with the group of elements.

17. The apparatus of claim 16, wherein the managing the storage system comprises:

obtaining the address mapping of the storage system, which has been updated as an updated address mapping; and updating matrix elements in the mapping matrix based on the updated address mapping.

18. The apparatus of claim 11, wherein the organizing the multiple chunks included in the storage system into the multiple groups comprises: determining the number of the multiple groups based on at least one of:

the number of the multiple chunks, a processing performance of a processor of the at least one processor in the storage system, and a storage space of the processor.

19. The apparatus of claim 11, wherein the creating the object vector based on the multiple objects stored in the storage system comprises:

dividing the multiple objects into multiple partitions; and determining multiple object elements in the object vector based on the multiple partitions, wherein the dividing the multiple objects into the multiple partitions comprises: determining the number of the multiple partitions based on at least one of the number of the multiple objects, a processing performance of a processor of the at least one processor in the storage system, and a storage space of the processor.

20. A computer program product, tangibly stored on a non-transient computer readable medium and comprising machine executable instructions which are used to implement operations, comprising:

creating, by the storage system comprising at least one processor, an object vector based on multiple objects stored in the storage system, an object element in the object vector being associated with at least one object among the multiple objects;

organizing multiple chunks included in the storage system into multiple groups;

for a group among the multiple groups, creating a chunk vector based on each chunk in the group, a chunk element in the chunk vector being associated with a chunk in the group; and creating a mapping matrix for managing the storage system based on the object vector and the chunk vector, the mapping matrix indicating where objects identified by the object vector are stored in chunks identified by the chunk vector.

* * * * *